April 11, 1950 W. P. DALRYMPLE 2,503,905
LUBRICATING SYSTEM
Filed June 3, 1948 3 Sheets-Sheet 1

Inventor:
William P. Dalrymple
By: Wallace and Cannon
Atty's.

April 11, 1950   W. P. DALRYMPLE   2,503,905
LUBRICATING SYSTEM
Filed June 3, 1948   3 Sheets-Sheet 2

Inventor:
William P. Dalrymple
By: Wallace and Connon
Atty's.

April 11, 1950     W. P. DALRYMPLE     2,503,905
LUBRICATING SYSTEM
Filed June 3, 1948     3 Sheets-Sheet 3
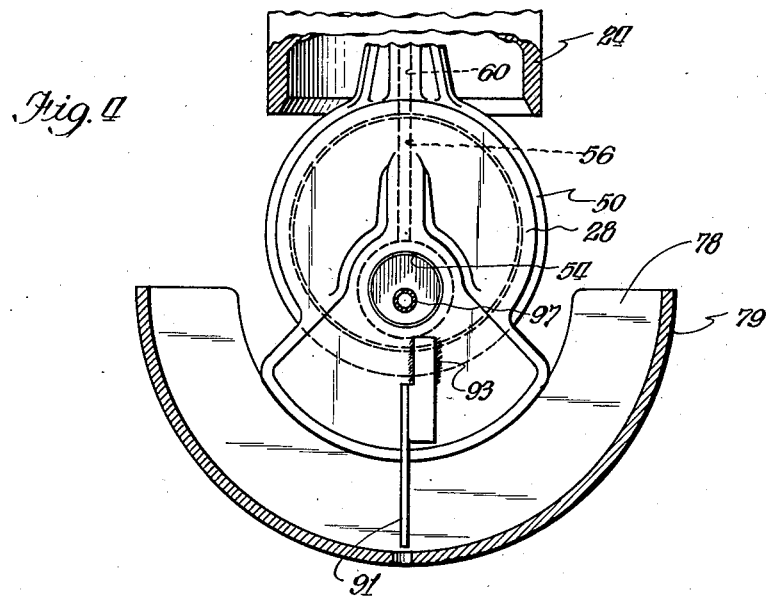
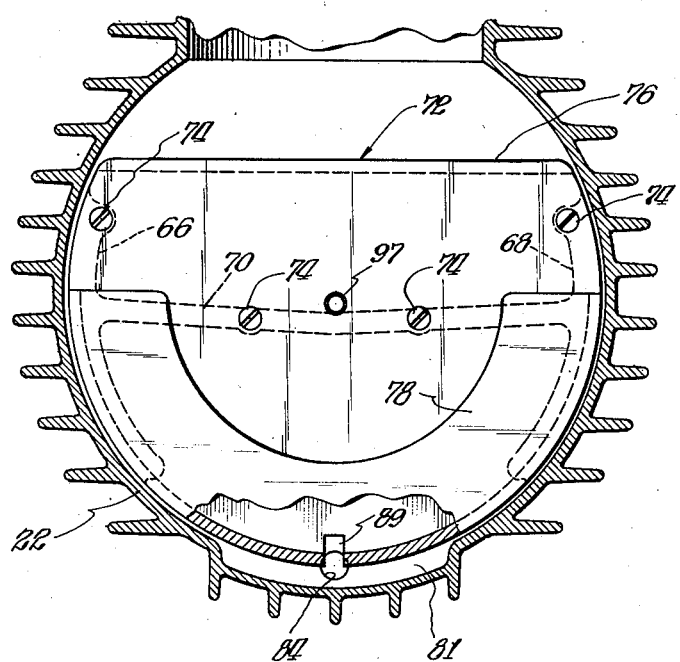
Inventor:
William P. Dalrymple
By: Wallace and Cannon
Atty's.

Patented Apr. 11, 1950

2,503,905

UNITED STATES PATENT OFFICE 2,503,905

LUBRICATING SYSTEM

William P. Dalrymple, Rochester, N. Y., assignor to American Brake Shoe Company, New York, N. Y., a corporation of Delaware Application June 3, 1948, Serial No. 30,951

4 Claims. (Cl. 184—13)

This invention relates to lubricating systems, and more particularly to lubricating systems for spraying lubricant to the bearing surfaces of connecting rods, and the like, that are used to associate the pistons and the crankshaft of piston and cylinder devices such as pumps, engines, compressors and the like.

In piston and cylinder devices of the aforementioned type heretofore known to those skilled in the art several different means have been used for lubricating the parts thereof. One type of such means has comprised special, auxiliary pumps used to feed lubricant to the various parts of the piston and cylinder devices under positive pressure. Lubricating devices of this latter character have had several disadvantages such as, for example, being relatively expensive to produce and, also, being relatively complicated in construction so that the manufacturing and maintenance problems thereon were substantial.

Another lubricating means heretofore known to the art for feeding lubricant to piston and cylinder devices has been of a type which included a ring having its upper end disposed on a rotating part of the device, such as, for example, the crankshaft, or the like, and the lower end disposed so as to run in oil contained in the crankcase of the device so that, upon rotation of the crankshaft, the ring was caused to rotate through the oil and thereby transmit oil onto the crankshaft from which it was fed to the other parts of the piston and cylinder device. Lubricating systems of this latter character which have been heretofore known to the art have had several inherent disadvantages such as, for example, being relatively complicated in construction; being relatively expensive to manufacture; being relatively expensive and complicated to maintain in proper operating condition; or, being noisy in operation, this being especially true when the piston and cylinder device has been disposed at a slight angle from the level position at which it was intended to run so that the ring or other working parts of the lubricating system, and many of which are relatively loosely mounted in devices of that character, have tended to strike against other parts of the device during an operation of the latter.

It is a primary object of my invention to enable a piston and cylinder device of the aforementioned type to be constructed, wherein a lubricating system may be included which does not have the aforesaid disadvantages of the lubricating systems heretofore known in the art.

Another object of my invention is to afford a lubricating system whereby lubrication of the working parts of a piston and cylinder device may be afforded in a novel and expeditious manner by feeding oil thereto both under pressure and in the form of a spray in a novel and expeditious manner.

An ancillary object is to enable a piston and cylinder device of the aforementioned type to be constructed wherein a novel lubricating system is embodied for creating a spray of oil within the device, and the oil spray is utilized in a novel and expeditious manner to lubricate certain parts of the device and, also, to feed oil to novel means for feeding oil under pressure to other portions of the device.

A further object of my invention is to afford a lubricating system for piston and cylinder devices whereby, upon rotation of the crankshaft of the device, oil may be fed by a member firmly connected to the crankshaft into a receptacle from which it may flow into means associated with the crankshaft for feeding the oil onto the bearing surfaces of the connecting rods, or the like, used in the device.

A further object of my invention is to afford a lubricating system for piston and cylinder devices which is practical in construction and efficient in operation and which may be economically produced commercially.

Other and further objects of my invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 4 is a detail sectional view taken substantially along the line 4—4 in Fig. 2; and Fig. 5 is a detail sectional view taken substantially along the line 5—5 in Fig. 2.

Figure 1:
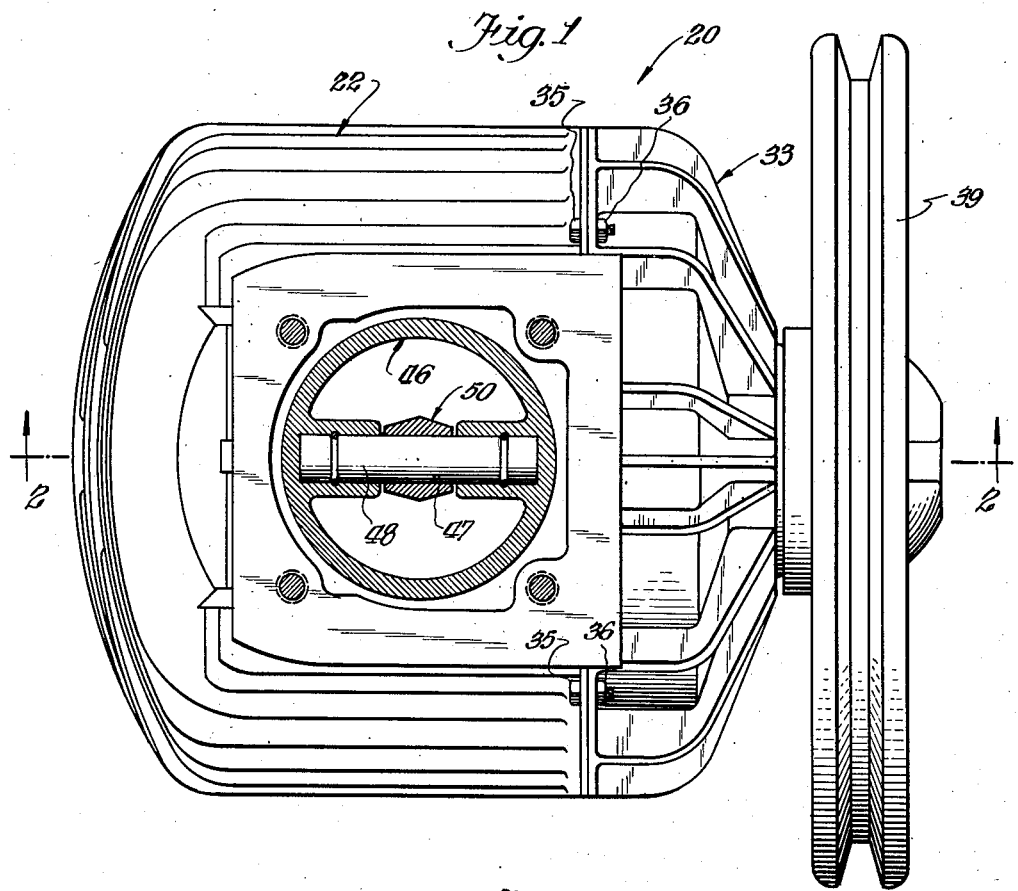
Fig. 1 is a top plan view partially in section, showing a compressor embodying the principles of my invention.

For the purpose of disclosing my invention, a compressor 20, embodying the principles of my invention, is herein illustrated in the drawings. The compressor 20 comprises a crankcase 22 on which is mounted a cylinder 24. A crankshaft 26, including a crank or eccentric 28 mounted on one end 29 thereof and secured thereto by set screws 31 and 32, is journaled in a bearing 34 afforded on an end plate 33 mounted on the crankcase 22, the end plate 33 being attached to the crankcase by suitable means such as bolts 35 and nuts 36.

The end 37 of the crankshaft 26 opposite the end 29 thereof projects outwardly from the crankcase 22 and a V-pulley 39, for driving the crankshaft 26, is mounted on the outer end portion 37 and secured thereto by suitable means such as, for example, a key 41 and a set screw 42.

Figure 3:
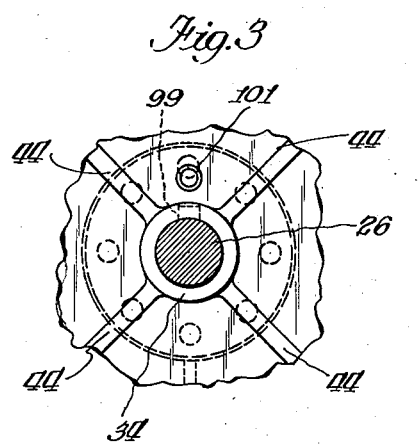
Fig. 3 is a detail sectional view taken substantially along the line 3—3 in Fig. 2.
Figure 2:
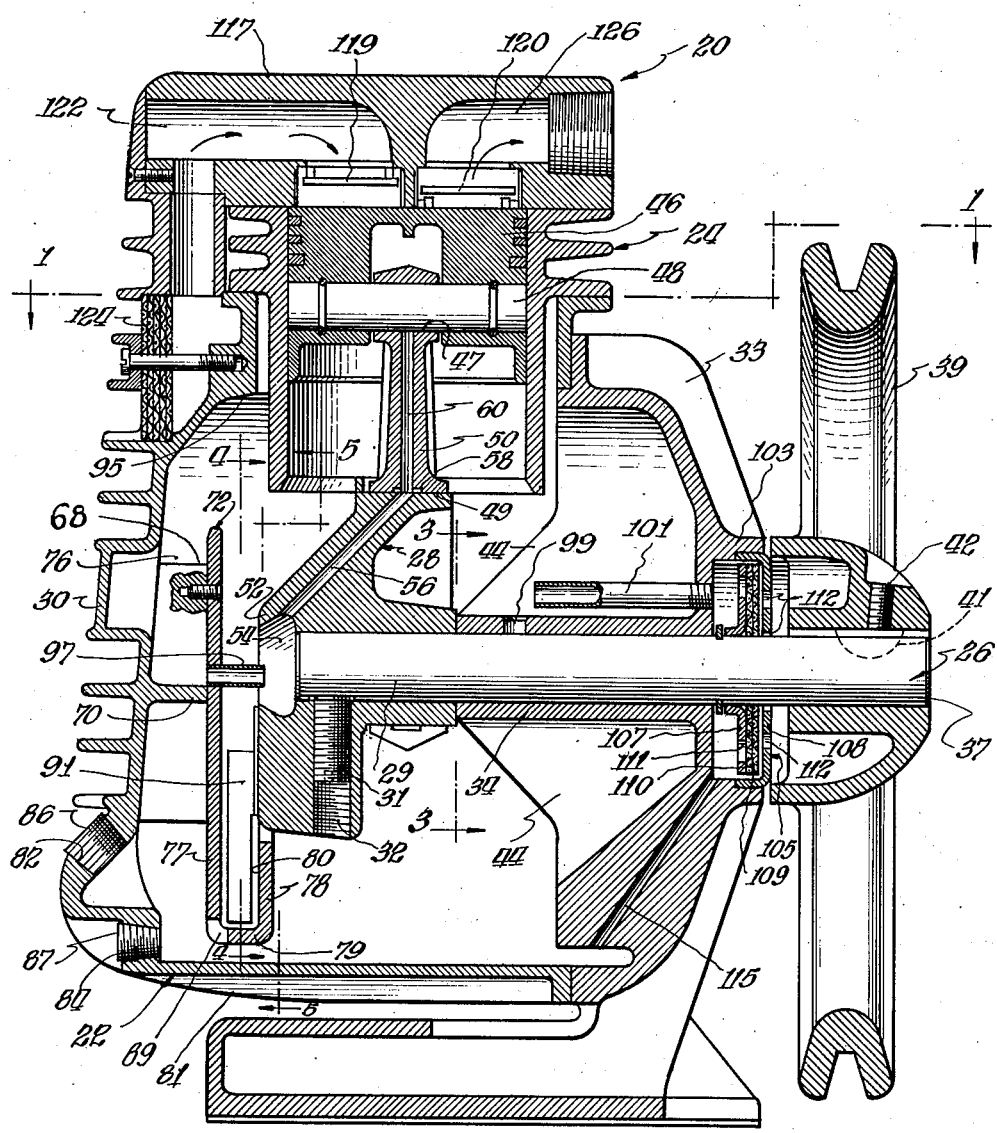
Fig. 2 is a sectional view taken substantially along the line 2—2 in Fig. 1.

As is best seen in Fig. 2 the crankshaft 26 does not extend entirely across the interior of the crankcase 22, the inner end portion 29 of the crankshaft terminating short of the adjacent side wall 30 of the crankcase 22 opposite the end plate 33, for reasons which will be discussed in greater detail hereinafter. The bearing 34 projects inwardly a considerable distance from the main body portion of the end plate 33 so as to afford a suitable support for the crankshaft 26, and four ribs 44 projecting inwardly from the main body portion of the end plate 33, Figs. 2 and 3, and attached to the bearing member 34 insure the rigid support of the bearing member 34.

A piston 46 having a piston pin 48 is mounted in the cylinder 24 and is connected to the crank 28 on the crankshaft 26 by a connecting rod 50, the piston pin 48 being journaled in a bearing 47 on one end of the connecting rod 50, and the crank 28 being journaled in a bearing 49 on the other end of the connecting rod 50.

The crank 28 is mounted on the inner end portion 29 of the crankshaft 26 in a manner whereby one face 52 thereof is disposed in spaced relation to the side wall 30 of the crankcase 22, and a substantially cup-shaped recess 54 is afforded in the face 52 of the crank 28 in axial alignment with the crankshaft 26. A passageway 56 extending outwardly through the crank 28 from an outer peripheral edge portion of the recess 54 is in communication at its outer end with a groove 58 formed in the bearing 49 of the connecting rod 50. Another passageway 60 extends longitudinally through the connecting rod 50 from the groove 58 to the bearing 47 for the piston pin 48. The passageway 56, the groove 58, and the passageway 60 afford conduits through which oil may be fed from the recess 54 to the bearings 47 and 49 during operation of the compressor 20, as will be discussed in greater detail presently.

Two bosses 66 and 68, Figs. 2 and 5, project inwardly from the main body portion of the side wall 30, near the peripheral edge portions thereof, and are interconnected by a substantially horizontally extending flange member 70 which also projects inwardly from the side wall 30 at substantially the same level as that in which the crankshaft 26 is disposed.

A substantially arcuate-shaped partition member 72, Fig. 5, having two parallel legs 77 and 78, in the form of plate members, interconnected by an intermediate member 79, Fig. 2, is mounted on the bosses 66 and 68 and the flange 70 between the side wall 30 and the adjacent end of the crankshaft 26. As is best seen in Figs. 2 and 5, the legs 77 and 78 are of unequal length, the leg 78 being shorter than the leg 77 and being disposed in the lower end portion of the crankcase 22 beneath the adjacent end of the crankshaft 26, whereas the longer leg 77 projects from the lower end portion of the crankcase 22 upwardly past the flange 70 and is attached to the flange 70 and the bosses 66 and 68 by suitable means such as screws or bolts 74. Thus, it will be apparent that the leg 77 is disposed in spaced relation to the side wall 30 of the crankcase 22 and the upper end portion thereof, together with the flange 70, the bosses 66 and 68, and the side wall 30, affords an upwardly opening receptacle 76 disposed within the crankcase 22 and extending above the crankshaft 26.

The lower end portion of the crankcase 22 is constituted and arranged to hold a supply of lubricant such as oil therein, having an oil-sump or well 81 formed in the central portion of the bottom wall thereof. A filler-opening 82 and a drain-opening 84 are provided in the lower end portion of the crankcase 22 and are closed by suitable means such as plugs 86 and 87, respectively. Thus, it will be seen that the lower end portion of the crankcase 22 may be readily filled to the level of the filler-opening 82 by removing the plug 86 therefrom and pouring the oil in through the opening 82.

As is best seen in Fig. 2, the leg 78, the intermediate member 79 and the lower end portion of the leg 77, of the partition member 72 afford an upwardly opening trough 88 in the lower end portion of the crankcase 22, and an opening 89 formed at the juncture of the leg 77 with the intermediate member 79 affords a passageway through the partition member 72 disposed below the upper level of the oil in the lower end portion of the crankcase 22 and through which oil may flow into the trough 88. An elongated pick-up member or finger 91 is attached to the face 52 of the crank 28 by any suitable means such as, for example, by welding 93 and is disposed thereon in a manner whereby, upon rotation of the crankshaft 26, the pick-up member 91 passes through the trough 88.

In so passing through the trough 88, during operation of the compressor 20, the pick-up member 91 carries oil in the trough ahead of it and is effective to throw the oil upwardly into the upper interior of the crankcase 22. A portion of the oil so thrown up into the interior of the crankcase 22 falls into the receptacle 26 or strikes the top wall 95 of the crankcase 22 and runs therealong and down the side wall 30 into the receptacle 76. Other portions of this oil fill the interior of the crankcase with a relatively fine spray and are effective to bathe other parts of the compressor, such as, for example, the walls of the cylinder 24, with oil as will be discussed in greater detail presently.

A tube 97 is mounted in and extends through the partition member 72 at the lower end portion of the receptacle 76 and projects therefrom into the recess 54 formed in the crank 28 and thereby affords a conduit from which oil in the receptacle 76 may flow into the recess 54. During operation of the compressor 20, the crankshaft 26, in which the recess 54 is formed, is, of course, rotating and the rotation thereof is effective, by the centrifugal force created, to throw the oil fed into the recess 54 outwardly through the passageways 56, 58 and 60 onto the bearing surface of the piston pin 48 to lubricate the latter.

A part of the spray created by the passage of the finger member 91 through the oil in the trough 88 is carried against the inner surface of the cylinder 24 and against the inner surface of the end plate 33, and a certain portion thereof tends to run down the upwardly extending ribs 44 on the end plate 33 onto the outer surface of the bearing 34. An opening 99 is afforded in the bearing 34 between the two upstanding ribs 44 and affords a passageway through which oil descending from the upper surfaces of the end plate 33 and from the side walls of the cylinder 24 may run into the bearing 34 and afford lubrication between the bearing surface thereof and the bearing surface of the crankshaft 26.

A breather, whereby air may pass into and out of the crankcase 22 to afford ventilation therefor, is provided in the crankcase 22 by a tube 101 mounted in the end plate 33 and affording a passageway between the interior of the crankcase 22 and the interior of a collar member 103 mounted on and projecting from the end plate 33 concentrically around the drive shaft 26. A filter 105, of the same general type as that disclosed in my co-pending application, Serial No. 706,262 filed October 28, 1946, and comprising a rotatable filter element 107 mounted in a housing 108, is disposed in the outer end portion of the collar 103 in a manner whereby air passing into or out of the crankcase 22 through the tube 101 passes through the filter 105. The filter element 107 comprises a porous filter pad 109 attached to a disc-shaped backing member 110 which is secured to the crankshaft 26 for rotation therewith. Openings 111 and 112 are formed in the backing member 110 and the filter housing 108, respectively, and afford air passageways therethrough. Thus, it will be seen that air passing into and out of the crankcase 22 through the breather tube 101 passes through the filter 105 and is filtered by the porous filter pad 109.

It will be remembered that during an operation of the compressor 20, the interior of the crankcase 22 is filled with oil spray and, therefore, it will be apparent that air passing outwardly therefrom through the tube 101 will necessarily have particles of oil entrained therein. The filter 105, like the filter disclosed in my aforesaid co-pending application, is effective to remove the entrained oil from the air and retain it within the crankcase 22. This is accomplished, as is more fully discussed in my aforesaid copending application, by the filtering action of the rotating filter pad 109 whereby the oil entrained in the air passing outwardly through the tube 101 is centrifuged outwardly into the collar 103 from which it is returned through a passageway 115 formed in the end plate 33 back into the lower end portion of the crankcase 22.

A cylinder head 117 is, of course, mounted on the upper end portion of the cylinder 24 and suitable valves such as the intake valve 119 and the exhaust valve 120, shown diametrically in Fig. 2, are afforded for controlling the flow of air into and out of the cylinder 24. An air inlet 122, disposed in communication between the intake valve 119 and the atmosphere, and having a filter 124 mounted therein, affords a passageway through which air may be fed from the atmosphere to the intake valve 119; and an air outlet passageway 126 formed in the cylinder head 117 affords a passageway through which compressed air may be fed from the exhaust valve 120 to a receiver, not shown, connected to the compressor.

Operation

In the operation of the compressor 20 shown in the accompanying drawings, the V-pulley 39 is rotated by a suitable source of power, not shown, to thereby rotate the crankshaft 24. During such rotation of the crankshaft 26 the pick-up member, or finger 91 is rotated therewith and passes into and out of the trough 80 and, during such rotation, is effective to throw a spray of oil upwardly from the trough 80 into the upper portion of the interior of the crankcase 22. A part of the spray of oil thus created is thrown into the receptacle 76 and flows downwardly through the tube 97 into the recess 54 formed in the face 52 of the crank 28. During rotation of the crankshaft 26 the crank 28, of course, rotates therewith and the oil fed into the recess 54 is thrown outwardly against the outer walls thereof by the centrifugal force created by the rotation of the crankshaft 26 and is thereby thrown outwardly through the passageway 56 into the groove 58 and the passageway 60 whereby a portion of it is effective to lubricate the bearing surfaces between the connecting rod 50 and the crank 28 and another portion of it is effective to lubricate the bearing surfaces between the piston pin 48 and the connecting rod 50. Thus it will be seen that an effective means for feeding oil under positive pressure to the interior of the piston 46 and to the interior of the connection between the connecting rod 50 and the crank 28 is afforded by my novel lubricating system.

The oil thrown up by the pick-up member 91, in addition to feeding oil to the receptacle 76, affords a spray of oil which substantially fills the interior of the crankcase 22 and thereby affords a lubricating bath for the exterior of the working parts disposed in the crankcase 22. As previously discussed, a part of the oil flows through the opening 99 into the bearing 34 and affords lubrication between the latter and the crankshaft 26.

Excess oil thrown up by the pick-up member 91 falls by gravity, and passes down the side walls of the crankcase 22 by gravity, into the lower end portion of the crankcase, this latter oil including any oil removed from the air passing outwardly through the breather tube 101 to the filter 105 as previously explained.

While I have shown my novel lubricating system herein as embodied in an air compressor, this has been done merely by way of illustrating my invention and not by way of limitation thereto, and it will be understood that my novel lubricating system may be equally as well embodied in other types of piston and cylinder devices such as pumps, engines and the like without departing from the purview of my invention.

From the foregoing it will be seen that I have provided a novel lubricating system which is constructed, and operates, in a novel and expeditious manner, and wherein the parts are secured relative to each other in such a manner that there is no danger of the parts rattling or striking each other during operation of a piston and cylinder device in which they are embodied.

Also it will be seen that I have afforded a novel lubricating system which is practical and efficient in operation and may be economically produced commercially.

Thus, while I have illustrated and described the preferred embodiment of my invention, it is to be understood that this is capable of variation and modification and I, therefore, do not wish to be limited to the precise details set forth, but desire to avail myself of such changes and alterations as fall within the purview of the following claims:

I claim:

1. In a piston and cylinder device, a crankcase having two oppositely disposed side walls, a cylinder mounted on said crankcase, a piston mounted in said cylinder, a drive shaft rotatably mounted in one of said side walls and having one end portion thereof projecting inwardly toward the other of said side walls and terminating in spaced relation thereto, said end portion of said drive shaft having a cup-shaped recess formed in the end face thereof, means operatively connecting said piston and said drive shaft in power transmitting relationship, a partition member mounted on said other side wall in spaced relation thereto so as to afford a receptacle in said crankcase above said recess, a conduit member extending between said receptacle and said recess and affording a communicating passageway therebetween, said partition member having a channel-shaped portion disposed on one end thereof and affording a trough adapted to hold a supply of oil therein, an elongated member mounted on said drive shaft for rotation therewith for throwing oil from said channel-shaped portion of said partition member into said receptacle, said elongated member projecting radially outwardly from said drive shaft and being disposed thereon in a manner to pass through the said trough during rotation of said drive shaft, and means including said first named means defining a passageway interconnecting said recess to the interior of said piston for feeding oil from said recess to said piston during rotation of said drive shaft.

2. In a piston and cylinder device a crankcase having two oppositely disposed side walls and being adapted to hold a supply of oil in a portion thereof, a cylinder mounted on said crank case above said portion, a piston mounted in said cylinder, a drive shaft rotatably mounted in one of said side walls and having one end portion thereof projecting inwardly toward the other of said side walls and terminating in space relation thereto, said end portion of said drive shaft having a substantially cup-shaped recess formed in the end face thereof, means operatively connecting said piston and said drive shaft in power transmitting relationship, a partition member mounted on said other side wall between said other side wall and said end of said drive shaft and in spaced relation to said other side wall so as to afford a receptacle in said crankcase above said recess, a conduit member extending between said receptacle and said recess and affording a communicating passageway therebetween, said partition member having a substantially L-shaped extension disposed on the end thereof adjacent to the said portion of said crankcase and affording a trough opening toward said cylinder and adapted to hold a supply of oil therein, a pick-up member mounted on said drive shaft and rotatable therewith for throwing oil from said L-shaped extension of said partition member into said receptacle, said pick-up member projecting radially outwardly from said drive shaft and being disposed thereon in a manner whereby said pick-up member is operable to pass through said trough during rotation of said drive shaft, and means including said first named means defining a passageway interconnecting said recess to the interior of said piston for feeding oil by centrifugal force from said recess to said piston during rotation of said drive shaft.

3. A compressor comprising a crankcase having a lower end portion adapted to hold a supply of oil, a cylinder mounted in the upper end portion of said crankcase, a piston reciprocably mounted in said cylinder, means for reciprocating said piston within said cylinder, said means including a drive shaft rotatably mounted in said crankcase and operatively connected to said piston for reciprocating the latter upon rotation of said drive shaft, said drive shaft having one end portion disposed within said crankcase and having a recess formed in the end face of said one end portion, a channel member mounted on one wall of said crankcase in a manner to afford a chamber between said wall and said channel member, an elongated member mounted on said drive shaft for rotation therewith and operable upon rotation with said drive shaft to pass into and out of said channel member to thereby throw oil in said channel member upwardly out of said channel member into said chamber, a conduit mounted in said channel member and extending between said chamber and said recess to afford a passageway therebetween which is disposed in a manner whereby oil in said chamber may flow into said recess, and means, including a passageway extending transversely through said drive shaft into communication with said recess, for feeding oil under pressure from said recess into said piston to lubricate the latter during rotation of said drive shaft.

4. In a piston and cylinder device, a crankcase adapted to hold a supply of oil in the lower end portion thereof, and having two oppositely disposed side walls, a cylinder mounted on the upper end portion of said crankcase, a piston mounted in said cylinder, a drive shaft rotatably mounted in one of said side walls above said lower end portion of said crankcase and having one end portion projecting inwardly toward the other of said side walls and terminating in spaced relation thereto, a plate member eccentrically mounting on said one end portion of said drive shaft for rotation therewith and having one face disposed toward said other side wall, said one face of said plate member having a cup-shaped recess formed therein in alignment with the longitudinal axis of said drive shaft, a plurality of abutment members, including a horizontally extending flange, disposed on and projecting inwardly from said other side wall above the lower edge of said recess, a U-shaped partition member having a long leg portion and a short leg portion interconnected by an intermediate portion, said partition member being mounted on said other side wall in engagement with said abutment member and in spaced relation to said other side wall to afford a receptacle above said flange and between said other side wall and said partition member, said short leg portion and said intermediate portion of said partition member being arcuate in shape and projecting inwardly from said long leg portion of said partition member in a manner to afford a substantially arcuate-shaped trough in the lower end portion of said crankcase for holding a supply of oil, an elongated finger member mounted on said one face of said plate member for rotation with said plate member, said finger member projecting radially outwardly from the longitudinal axis of said shaft in a position to pass through said trough during rotation of said drive shaft and being adapted during such movement to throw oil from said trough upwardly into said receptacle, a tube mounted in said long leg of said partition member and extending from said receptacle to said recess for feeding oil from said receptacle into said recess, means including a piston rod and said plate member operatively connecting said piston and said drive shaft in power transmitting relationship, and means defining a passageway through said plate member and said piston rod between said recess and the interior of said piston for feeding oil by centrifugal force from said recess into said cylinder during rotation of said drive shaft.

WILLIAM P. DALRYMPLE.

REFERENCES CITED

The following references are of record in the file of this patent:

UNITED STATES PATENTS

| Number | Name | Date |
| --- | --- | --- |
| 1,517,227 | Brockway | Nov. 25, 1924 |
| 1,881,149 | Towle | Oct. 4, 1932 |
| 2,298,749 | Buschmann | Oct. 13, 1942 |

FOREIGN PATENTS

| Number | Country | Date |
| --- | --- | --- |
| 654,882 | France | Oct. 30, 1923 |
| 435,146 | Great Britain | Sept. 16, 1935 |